(12) United States Patent
Yamaguchi

(10) Patent No.: US 6,549,314 B1
(45) Date of Patent: Apr. 15, 2003

(54) OPTICAL CONTROL APPARATUS, OPTICAL JUNCTION APPARATUS, OPTICAL ADM APPARATUS AND OPTICAL TRANSMISSION APPARATUS HAVING THEREOF

(75) Inventor: Shohei Yamaguchi, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/431,642

(22) Filed: Nov. 1, 1999

(30) Foreign Application Priority Data

Nov. 2, 1998 (JP) .......................................... 10-312172

(51) Int. Cl.[7] .............................. H04J 14/02; G02F 3/00
(52) U.S. Cl. ........................ 359/128; 359/124; 359/108
(58) Field of Search ................................. 359/124, 130, 359/108, 128

(56) References Cited

U.S. PATENT DOCUMENTS 6,035,079 A * 3/2000 Fields et al. ................. 359/204
6,169,625 B1 * 1/2001 Watanabe et al. ........... 359/108

OTHER PUBLICATIONS

Y. Hashimoto, et al., "Optical Noise Reduction by A Semiconductor Waveguide Saturable Aborber", *CPT'98 (International Topical Workshop on Contemporary Photonic Technology) Technical Digest Pc–13–1*, IEEE, Optical Society of America.

H. Kurita, et al., "All–Optical Signal Processing at over 100 Gbit/s With Nonlinear Effects in Semiconductor Lasers", *CPT'98 (International Topical Workshop on Contemporary Photonic Technology) Technical Digest Pc–14–1*, IEEE, Optical Society of America.

* cited by examiner

Primary Examiner—Jason Chan
Assistant Examiner—Shi K. Li
(74) Attorney, Agent, or Firm—Dickstein, Shapiro, Morin & Oshinsky, LLP

(57) ABSTRACT

An optical control apparatus having an optical reflector for selectively reflecting signal light having a specific wavelength, transmitting and outputting signal light having another wavelength and a saturable absorber for transmitting and outputting the transmitted signal light when an output level of the transmitted signal light is equal to or larger than a predetermined threshold value.

23 Claims, 16 Drawing Sheets

OPTICAL CONTROL APPARATUS, OPTICAL JUNCTION APPARATUS, OPTICAL ADM APPARATUS AND OPTICAL TRANSMISSION APPARATUS HAVING THEREOF

BACKGROUND OF THE INVENTION

1. Field of the Invention

The present invention relates to an optical control apparatus, an optical junction apparatus and an optical ADM apparatus and an optical transmission apparatus having the apparatus.

2. Description of Related Art

High reliability is requested in an optical submarine system. In such a system, a detour path is prepared as an auxiliary optical transmission system route in preparation for a case in which trouble is caused in a certain repeater or a cable. There is needed an optical junction apparatus for switching to transmission by the detour path when trouble is caused.

In the meantime, according to the optical junction apparatus in the above-described system, path switching must frequently be operated remotely when trouble is caused after a trouble spot has been specified by a test signal from an end office apparatus or the like. Therefore, the optical junction apparatus is requested to be able to operate to switch by a control signal from a remote location. As an optical junction apparatus capable of carrying out such a switching operation, there has conventionally known a constitution incorporating an optical switch for switching an optical path by mechanically moving an optical part such as a prism or the like by receiving a control signal from outside.

On the other hand, in order to deal with large capacity formation of a transmission capacity in recent years and to construct a flexible network among a plurality of stations, there has been reduced to practice wavelength division multiplexing optical transmission (hereinafter, referred to as "WDM optical transmission") using optical ADM apparatus. According to the WDM optical transmission using optical ADM (add-drop multiplexer) apparatus, optical ADM apparatus are arranged at transit stations arranged among end offices. End offices and transit stations are connected by optical transmission paths and there is transmitted wavelength division multiplexing light (hereinafter, referred to as "WDM signal light") in which a plurality of signal light having wavelengths different from each other are subjected to wavelength division multiplexing. Signal light having respective wavelength is allocated to respective channel.

The optical ADM apparatus is provided with a function of separating signal light from WDM signal light inputted from an optical transmission path as necessary and inserts the signal light into the optical transmission path when the optical ADM apparatus transmits from a certain transit station to the optical transmission path. There is known a conventional constitution in which in order to separate signal light inputted from an optical transmission path, for example, WDM signal light is temporarily divided into respective wavelengths of signal light by an optical wavelength division demultiplexer. According to the constitution, there is arranged an optical switch for respective divided signal light and by switching the optical switch, there is carried out a selection whether the respective signal light is to be separated to a side of a transit station or transmitted to the optical transmission path as it is.

However, according to the above-described conventional optical division apparatus or optical ADM apparatus, in any of the constitutions, in order to carry out optical path switching or selective sampling of signal light, an optical switch having a movable portion is used and accordingly, there is a certain limit in view of the reliability. Further, according to the optical ADM apparatus, it is also difficult to control separation and insertion of the optical ADM apparatus by a control signal from an end office or the like disposed upstream from the transit station. Levels of signal light which passes through the optical ADM apparatus and is shortcircuited and signal light newly inserted into the optical ADM apparatus need to be the same. However, there also is a case in which depending on the constitution of the optical ADM apparatus, the levels of both significantly differ from each other and the level of the signal light outputted from an optical amplifier needs to adjust.

SUMMARY OF THE INVENTION

It is a first object of an optical control apparatus, an optical junction apparatus and an optical ADM apparatus and a WDM optical transmission apparatus using thereof according to the present invention is being capable of controlling optical path switching operation and selective separation and insertion of signal light from outside with high reliability. A second object thereof resides in that adjustment of an output level of signal light outputted from an optical amplifier arranged in an optical ADM apparatus is made unnecessary.

According to an aspect of the present invention, there is provided an optical control apparatus comprising an optical reflector for selectively reflecting only signal light having a specific wavelength in inputted signal light and transmitting signal light having other wavelength and outputting transmitted signal light and a saturable absorber inputted with the transmitted signal light for transmitting the transmitted signal light and outputting first output signal light only when an output level of the transmitted signal light is equal to or larger than a predetermined threshold value. In this case, the optical reflector is inputted further with control signal light in addition to the signal light and when a wavelength of the control signal coincides with the specific wavelength, an output level of the signal light is set to be lower than the threshold value. Conversely, when the wavelength of the control signal does not coincide with the specific wavelength, a sum of the output level of the signal light and an output level of the control signal light is set to exceed the threshold value. The optical reflector can be constituted by using fiber gratings.

The optical junction apparatus according to the present invention is further provided with two optical couplers with the above-described optical control apparatus of the present invention as the basic constitution and carries out division and insertion of signal light by these optical couplers. Specifically, the optical junction apparatus according to the present invention is provided with a first optical coupler for dividing inputted signal light and outputting first divided signal light and second divided signal light, a first optical reflector, a first saturable absorber and a second optical coupler. The first optical reflector is inputted with first divided signal light, reflects selectively only light having a first specific wavelength, transmits light having other wavelength and outputs transmitted signal light. The first saturable absorber is inputted with the transmitted signal light, transmits the transmitted signal light only when an output level of the transmitted signal light is equal to or larger than a predetermined first threshold value and outputs first output signal light. The second optical coupler outputs the first inputted output signal light or second output signal light in the first output signal light and the second output signal light.

According to the above-described constitution, the first optical coupler is further inputted with control signal light in addition to the signal light. When a wavelength of the control signal light coincides with the first specific wavelength, the output level of the signal light inputted to the first saturable absorber is set to be lower than the first threshold value and when the wavelength of the signal light does not coincide with the first specific wavelength, a sum of the output level of the signal light and an output level of the control signal light which are inputted to the first saturable absorber are set to exceed the first threshold value. By adding the control signal light to the signal light, the output of the original signal light can be controlled by controlling the wavelength of the control signal light. Addition of the control signal light to the signal light can be carried out by using light having wavelengths different from each other for the two signal light and wavelength division multiplexing the two signal light.

When the control signal light is provided with the first specific wavelength, the control signal light is reflected by the optical reflector and accordingly, light inputted to the saturable absorber becomes only the original signal light. At this occasion, the output level of the signal light is set to become lower than the threshold value provided to the saturable absorber and accordingly, the signal light is not outputted from the saturable absorber. In contrast thereto, when the wavelength of the control signal light is shifted from the first specific wavelength, the control signal light is not reflected by the optical reflector and is inputted to the saturable absorber along with the signal light. By two of the signal light at this occasion, the output level is set to exceed the threshold value provided to the saturable absorber and accordingly, the signal light and the control signal light are outputted from the saturable absorber.

Further, according to the optical junction apparatus of the present invention, output control can be carried out by arranging a second optical reflector and a second saturable absorber for other signal light divided by the first optical coupler. In this case, the second optical reflector reflects selectively only second specific light. When the control signal light is provided with the first specific wavelength, the control signal light transmits through the second optical reflector and is reflected when the control signal is provided with the second specific wavelength. In this way, by controlling the wavelength of the control signal light between the first and the second specific wavelengths, an output end of the signal light can be controlled to switch. As the first and the second optical reflectors, for example, fiber gratings can be used.

By providing the second coupler at the poststage of the first saturable absorber, newly inserted signal light can be added.

The optical ADM apparatus according to the present invention is an optical ADM apparatus in which WDM signal light where a plurality of signal light having wavelengths different from each other are subjected to wavelength division multiplexing and control signal light are inputted, only separated signal light having a predetermined wavelength included in the WDM signal light is separated and inserted signal light having the predetermined wavelength is inserted. In this case, the optical ADM apparatus according to the present invention is provided with two of the above-described optical control apparatus. The first optical control apparatus outputs WDM signal light except the separated signal light in the WDM signal light when light having the second specific wavelength is inputted along with the WDM signal light. The second optical control apparatus outputs the WDM signal light as it is when light having the first specific wavelength is inputted. Further, the optical ADM apparatus according to the present invention is provided with a signal optical separating and inserting unit for wavelength division multiplexing the WDM signal light outputted from the optical control apparatus with inserted signal light and outputting wavelength division multiplexed signal light.

The signal light separating and inserting unit can be constituted by a first optical circulator arranged on an input side of the first optical control apparatus, a second optical circulator arranged on an output side of the first optical control apparatus and a signal light reflector arranged between the first optical control apparatus and the second optical circulator for selectively reflecting light having a wavelength of the separated signal light.

A further specific constitution of the optical ADM apparatus according to the present invention is provided with a first optical coupler, a first optical circulator, a first optical reflector, a first saturable absorber, a signal optical reflector, a synthesizing unit, a second optical reflector, a second saturable absorber and a second optical coupler.

The first optical coupler is inputted with WDM signal light in which a plurality of signal light having wavelengths different from each other are subjected to wavelength division multiplexing and outputs first divided WDM signal light and second divided WDM signal light by dividing the WDM signal light. According to the first optical circulator, first divided WDM signal light is inputted from a first port and the first divided WDM signal light is outputted to a second port and the first divided WDM signal light inputted from the second port is outputted to a third port. The first optical reflector is inputted with the first divided WDM signal light and outputs first transmitted WDM signal light by selectively reflecting only light having the first specific wavelength and transmitting light having other wavelength. The first saturable absorber is inputted with the first transmitted WDM signal light and outputs the first output WDM signal light by transmitting the first transmitted WDM signal light when the output level of the first transmitted WDM signal light is equal to or larger than the first threshold value.

The signal light reflector selectively reflects only the separated signal light having the predetermined wavelength from the first output WDM signal light, transmits signal light having other wavelength and outputs transmitted output WDM signal light. The multiplexeing unit wavelength couples the inserted signal light having a wavelength the same as that of the separated signal light and outputs multiplexd signal light to the transmitted output WDM signal light.

The second optical reflector is inputted with the second divided WDM signal light, reflects selectively only light having the second specific wavelength, transmits light having other wavelength and outputs the second transmitted WDM signal light. The second saturable absorber is inputted with the second transmitted WDM signal light and outputs second output WDM signal light by transmitting the second transmitted WDM signal light only when the output level of the second transmitted WDM signal light is equal to or larger than the predetermined second threshold value. The second optical coupler outputs to outside the inputted inserted signal or second output WDM signal light in the inserted signal light and the second output WDM signal light.

The multiplexing unit can be constituted by the second optical circulator in which the transmitted output WDM signal light is inputted from a fourth port, the transmitted output WDM signal light is outputted from a fifth output port and the inserted signal light inputted from the a sixth port is outputted to the fifth port and the inserted signal light inserted with the transmitted output WDM signal and the inserted signal light is outputted. Or, the multiplexing unit can also be constituted by a wavelength division multiplexer for multiplexing light having a wavelength of the signal light included in the transmitted output WDM signal light and light having a wavelength of the inserted signal light.

According to the above-described constitution, the first optical coupler is further inputted with control signal light in addition to the signal light. When the wavelength of the control signal light coincides with the first specific wavelength, the output level of the signal light inputted to the first saturable absorber becomes lower than the first threshold value. Conversely, when the wavelength of the control signal light does not coincide with the first specific wavelength, a sum of the output level of the signal light and the output level of the control signal light inputted to the first saturable absorber is set to exceed the first threshold value.

The first and the second optical reflectors can use fiber gratings similar to the optical junction apparatus. The output side of the second saturable absorber may be arranged with an optical variable attenuator for controlling the output level of the second transmitted WDM signal light.

The optical transmission apparatus according to the present invention is constituted by the above-described optical ADM apparatus and optical end office apparatus for transmitting the WDM signal light in which a plurality of signal light having wavelengths different from each other are subjected to wavelength division multiplexing and the control signal light multiplexed with the WDM signal light. The optical end office apparatus is provided with transmitters for respectively transmitting respective signal light included in the WDM signal light, control signal light sources for transmitting light having first specific wavelength and light having second specific wavelength and a wavelength division multiplexer for multiplexeing the WDM signal light and the control signal light.

The control signal light source is constituted by a first control signal light source for transmitting light having the first specific wavelength, a second control signal light source for transmitting light having the second specific wavelength and an optical switch for switching to output selectively the light having the first specific wavelength and the light having the second specific wavelength. The control signal light source can be constituted also by a light source and a wavelength controller for variably controlling light outputted from the light source to the first specific wavelength or the second specific wavelength.

The optical ADM apparatus is further provided with an optical receiver for receiving the separated signal light and an optical transmitter for transmitting the inserted signal light. In the above-described optical transmission apparatus, an optical amplifier for optically amplifying the WDM signal light and the control signal light may further be arranged between the optical end office apparatus and the optical ADM apparatus.

The optical transmission apparatus according to the present invention is an optical transmission apparatus having a plurality of the optical ADM apparatus according to the present invention, mentioned above, and in which the plurality of ADM apparatus are connected in a ring-like shape via an optical transmission path and the respective optical ADM apparatus is provided with an optical receiver for receiving the separated signal light and an optical transmitter for transmitting the inserted signal light.

BRIEF DESCRIPTION OF THE DRAWINGS:

The above and other objects, features and advantages of the present invention will become apparent from the following detailed description when taken in conjunction with the accompanying drawings wherein.

DETAILED DESCRIPTION OF THE PREFERRED EMBODIMENTS

First, before explaining an optical control apparatus, an optical junction apparatus, an optical ADM apparatus and an optical transmission apparatus using thereof according to the present invention, an explanation will be given of constitutions of conventional optical junction apparatus and optical ADM apparatus to facilitate to understand the present invention.

Figure 1:
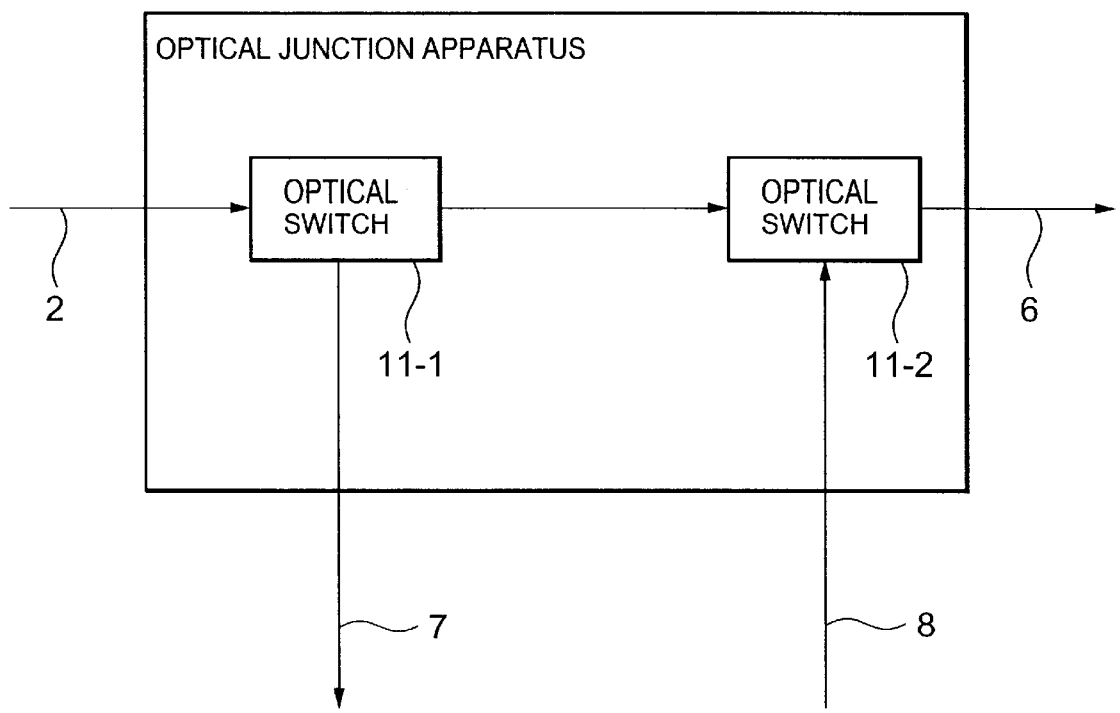
FIG. 1 is a diagram showing an example of a constitution of a conventional optical junction apparatus.

FIG. 1 is a diagram showing a basic constitution of an example of a conventional optical junction apparatus. The optical junction apparatus is provided with a switching function of whether signal light inputted from an input port 2 is outputted to a side of an output port 7 or outputted to an output port 6 as it is. When signal light inputted from the input port 2 is inputted, normally, in place of original signal, inserted signal light is inputted from an input port 8 and outputted from the output port 6.

In the conventional optical junction apparatus, to carry out switching of signal light, an optical switch 11-1 and an optical switch 11-2 are used. According to the optical switches 11-1 and 11-2, light path switching is controlled by control signals. However, a light path switching function is requested to the optical switch and normally, a mechanical switch is frequently used and therefore, there is a limit in maintaining high reliability. In addition thereto, it is difficult to control the operation by control signal light transmitted from outside of the optical junction apparatus.

Figure 2:
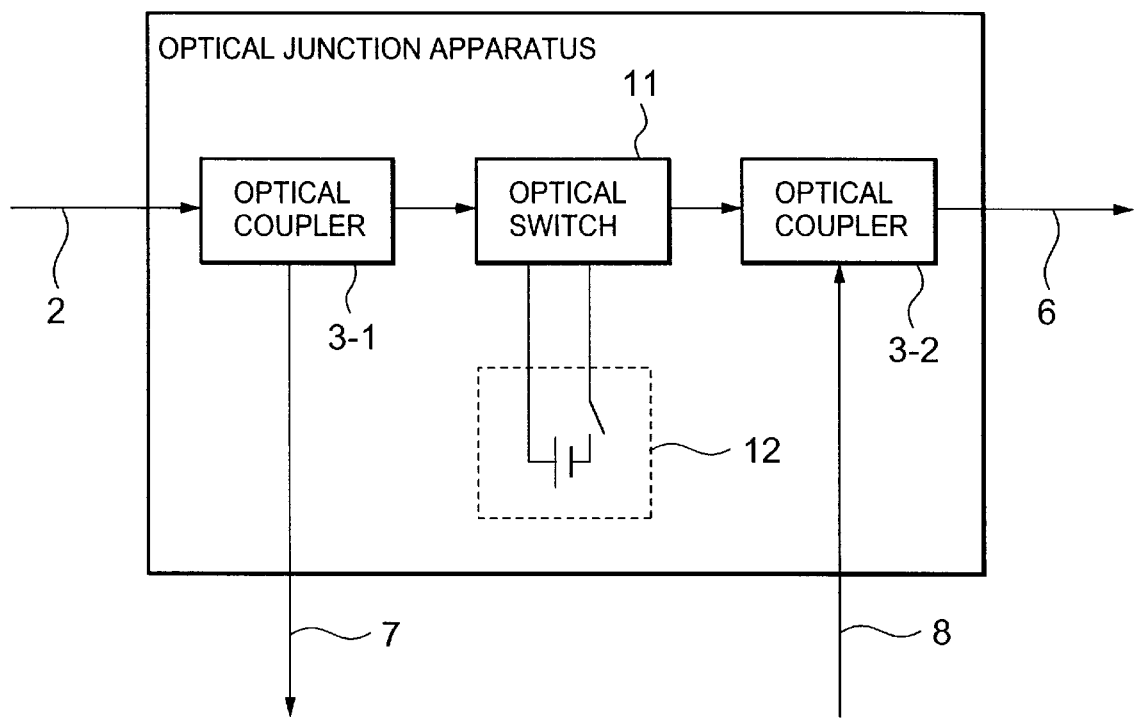
FIG. 2 is a diagram showing an example of other constitution of a conventional optical junction apparatus.

FIG. 2 is a diagram showing a basic constitution of other example of a conventional optical junction apparatus. The optical junction apparatus is constituted by the input port 2, optical couplers 3-1 and 3-2, an optical switch 11, a power source circuit 12, the divided output port 7, the divided input port 8 and the output port 6. According to the optical junction apparatus, normally, signal light inputted from the port 2 is outputted to the output port 7 and signal light inputted from the input port 8 is outputted to the output port 6. In contrast thereto, in this optical junction apparatus, by receiving a control signal from outside, the signal light inputted from the port 2 can be shortcircuited and outputted to the output port 6 as it is.

According to the light junction apparatus shown by FIG. 2, the signal light is inputted from the input port 2 to the optical coupler 3-1, a portion thereof is outputted to the divided output port 7 and other portion thereof is outputted to the output port 6 bypassing through the optical coupler 3-2 via the optical switch 11. The signal light inputted from the divided input port 8 also passes through the optical coupler 3-2 and is outputted from the output port 6. The optical switch is provided with a function of making passage of light ON/OFF by receiving a control signal from outside to thereby control switching operation. However, the optical path switching function is requested to the optical switch, normally, a mechanical switch is frequently used and therefore, there is a limit in maintaining high reliability. In addition thereto, it is difficult to control the light path switching by control signal light transmitted from outside of the optical junction apparatus.

An explanation will be given of the optical path switching operation of the above-described conventional optical junction apparatus. Normally the power source circuit 12 is controlled to make the optical switch 11 OFF. At this occasion, the signal light inputted from the input port 2 is outputted to the divided output port 7 via the optical coupler 3-1. In this case when the shortcircuiting is needed in the case of causing trouble at the divided side or the like, (in shortcircuiting), the power source circuit 12 is controlled to make the optical switch 11 ON and the signal light inputted from the input port 2 is shortcircuited to the output port 6 via the optical coupler 3-1, the optical switch 11 and the optical coupler 3-2.

Further, an explanation will be given of a conventional optical ADM apparatus and an optical transmission apparatus using thereof.

Figure 3:
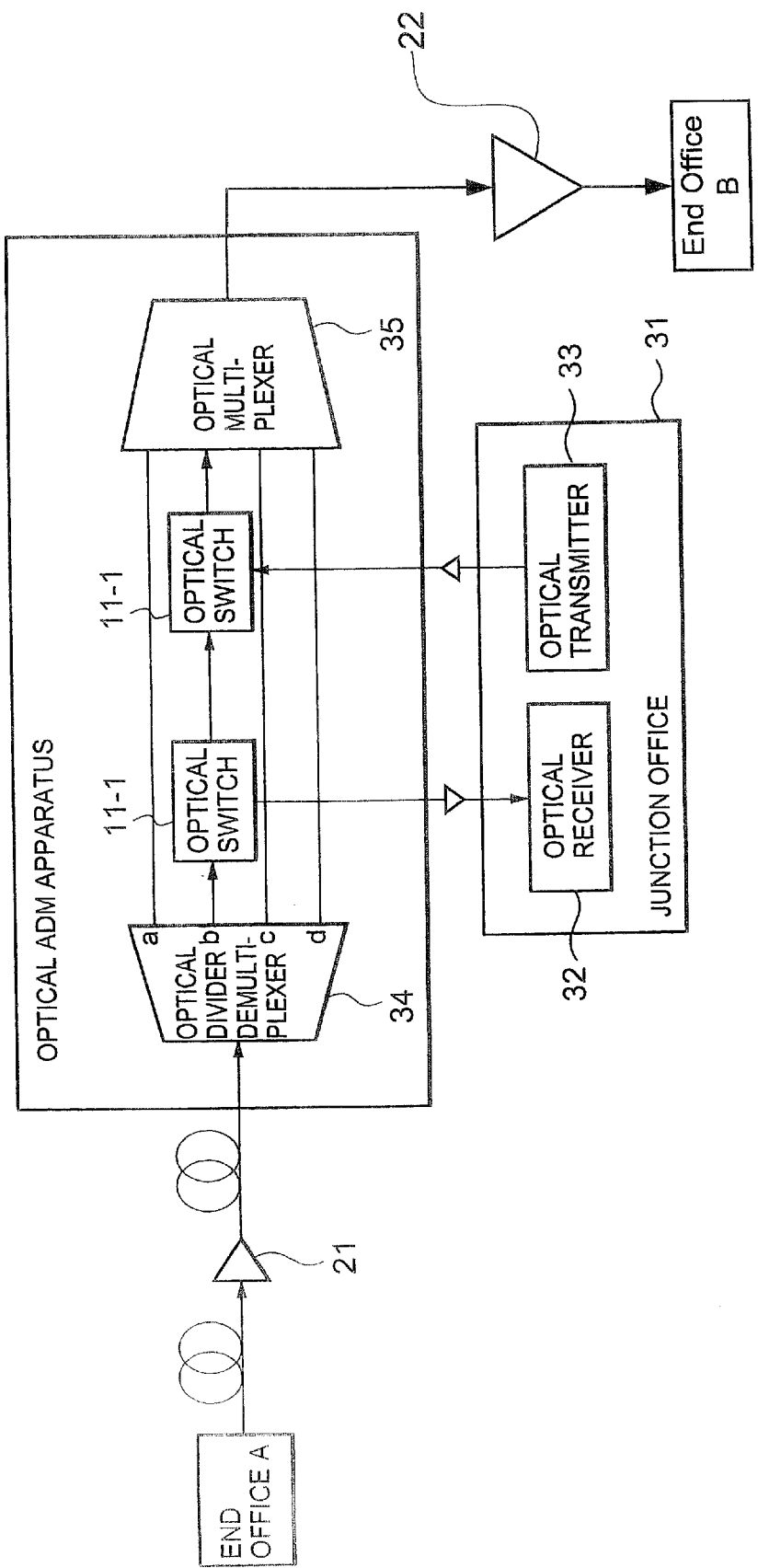
FIG. 3 is a diagram showing an example of a constitution of an optical transmission apparatus having a conventional optical ADM apparatus.

FIG. 3 is a diagram showing an example of a constitution of an optical transmission apparatus having a conventional optical junction apparatus or optical ADM apparatus. The optical transmission apparatus shown by FIG. 3 shows the most basic constitution of a system having the optical ADM apparatus. An end office A and an end office B are connected by an optical transmission path. An optical ADM apparatus is arranged between the two end offices and a junction office 31 is arranged via the optical ADM apparatus 1. Although in this case, only one junction office is arranged, there also is a case in which a number of them are arranged. Further, optical amplifiers 21 and 22 are arranged respectively between the end office A and the optical ADM apparatus 1 and between the optical ADM apparatus 1 and the end office B and the signal light is optically amplified by the optical amplifiers 21 and 22.

In the optical ADM transmission apparatus, the signal light transmitted from the end office A is WDM signal light in which a plurality of signal light having wavelengths different from each other are subjected to wavelength division multiplexing. According to the optical ADM apparatus, signal light having a wavelength selected in the wavelength division multiplexing signal light can be separated from the optical transmission path and can be separated to the side of the junction office 31 (lower side in the drawing). According to the optical ADM apparatus, the WDM signal light is temporarily divided into respective signal light by a wavelength division demultiplexer 34. Only signal light to be separated which is determined for the respective optical ADM apparatus (in this case, signal light having a wavelength "b") is subjected to optical path switching by an optical switch 11-1.

In separating the signal light, divided signal light is received by an optical receiver 32 disposed at inside of the junction office 31. When there is signal light which is newly inserted, inserted signal light transmitted from an optical transmitter 33 is inserted via an optical switch 11-1 and synthesized with other signal light by a wavelength division multiplexer 35.

Figure 4:
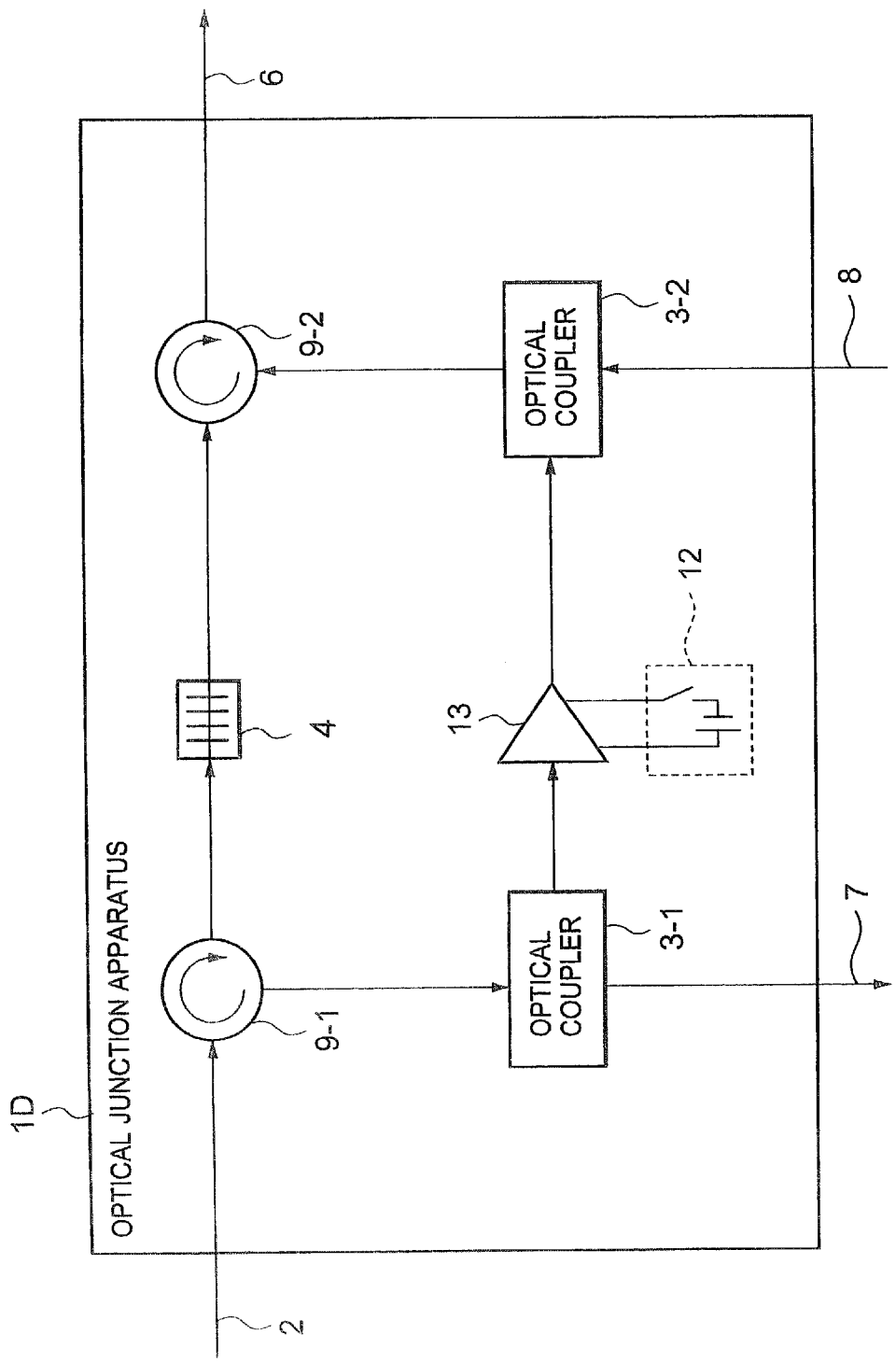
FIG. 4 is a diagram showing an example of other constitution of a conventional optical ADM apparatus.

FIG. 4 is a diagram showing an example of other constitution of a conventional optical ADM apparatus. The optical ADM apparatus is also applicable to the optical transmission apparatus shown by FIG. 2. The optical ADM apparatus 1D is constituted by the input port 2, the optical couplers 3-1 and 3-2, the power source circuit 12, an optical amplifier 13, the divided output port 7, the divided input port 8, optical circulators 9-1 and 9-2 and fiber gratings 4. The fiber gratings 4 are provided with a function of reflecting only light having a specific wavelength (wavelength "b") and transmitting light having other wavelength.

The signal light (wavelengths a through d) are inputted from the input port 2 to the optical circulator 9-1. The signal light inputted to the optical circulator 9-1 is outputted from an output terminal (right side in the drawing), passes through the fiber gratings 4 and thereafter outputted from the output port 6 by passing through the optical circulator 9-2. Meanwhile, signal light (wavelength "b") reflected by the fiber gratings 4 is outputted from a first output of the optical circulator 9-1, passes through the optical coupler 3-1 and thereafter outputted to the divided output port 7. Signal light (wavelength "b") inputted from the divided input port 8 passes through the optical coupler 3-2 and thereafter coupled with other signal at the optical circulator 9-2 and outputted from the output port 6.

An explanation will be given of operation of separating and inserting signal light in the optical ADM apparatus according to the above-described conventional example. In separating and inserting operation, the power source circuit 12 is controlled to make the optical amplifier 13 OFF. Signal light (wavelength "b") inputted from the input port 2 and reflected by the fiber gratings 4 is outputted to the divided output port 7. When trouble is caused on the divided side, the power source circuit 12 is controlled to make the optical amplifier 13 ON and the signal light (wavelength "b") is shortcircuited to the output port 6.

According to the optical dividing apparatus shown by FIGS. 1 and 2 and the optical ADM apparatus shown by FIGS. 3 and 4, mentioned above, mechanical type optical switches are used and therefore, there is a limit in achieving high reliability. According to the optical ADM apparatus shown by FIGS. 3 and 4, when the shortcircuited signal light is coupled with the inserted signal light, an output level of the optical amplifier 13 needs to adjust to make the level of the signal light with a level of other signal light. Further, in either of the constitution, it is difficult to control switching or separating/inserting operation by control signal light from an upstream end office.

Next, a detailed explanation will be given of an optical control apparatus, an optical junction apparatus, an optical ADM apparatus and an optical transmission apparatus using thereof in reference to the drawings as follows. The optical control apparatus according to the present invention constructs basic constitutions of the optical junction apparatus and the optical ADM apparatus, explained below and therefore, an explanation will firstly be given of the optical control apparatus.

Figure 5:
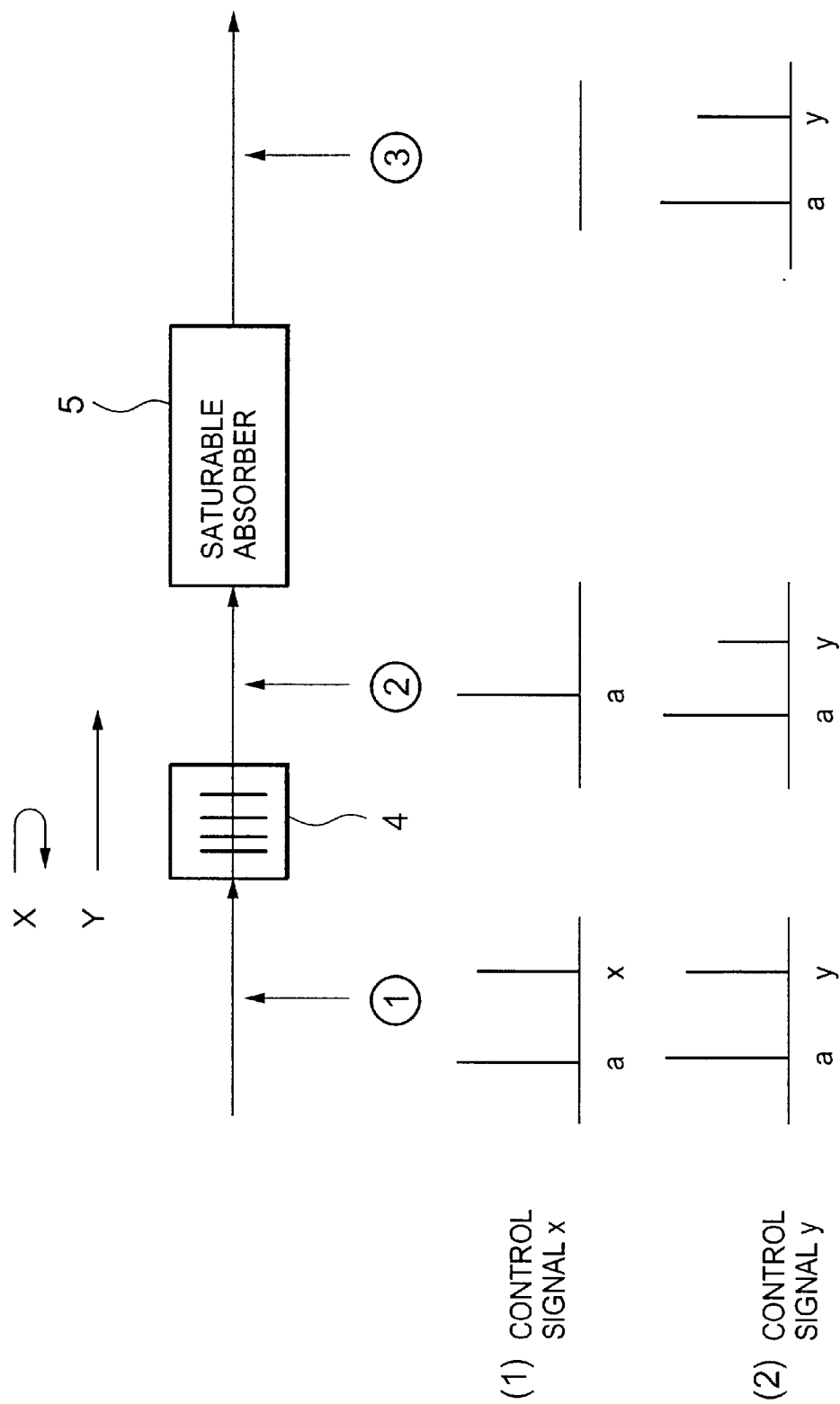
FIGS. 5(1) and 5(2) are diagrams showing constitution and basic operation of an optical control apparatus according to the present invention in which FIG. 5 (1) shows a case in which control signal light having a wavelength x is inputted and FIG. 5(2) shows a case in which control signal light having a wavelength y is inputted, respectively.

FIGS. 5(1) and 5(2) are diagrams showing constitution and basic operation of the optical control apparatus according to the present invention in which FIG. 5(1) shows a case in which control signal light having a wavelength "x" is inputted and FIG. 5(2) shows a case in which control signal light having a wavelength "y" is inputted, respectively. The optical control apparatus according to the present invention is constituted by an optical reflector 4 and a saturable absorber 5 connected to a poststage thereof. In this case, the optical reflector 4 is provided with a function of selectively reflecting only signal light having a specific wavelength in inputted signal light and transmitting signal light having other wavelength and outputting transmitted signal light. The saturable absorber inputs the transmitted signal light, transmits the transmitted signal light only when an output level of the transmitted signal light is equal to or larger than a predetermined threshold value and outputs first output signal light.

The optical control apparatus is inputted with light added with control signal light in addition to original signal light. In this case, when a wavelength of the control signal light coincides with a specific wavelength, the output level of the signal light is set to become lower than the threshold value. Conversely, when the wavelength of the control signal does not coincide with the specific wavelength, a sum of the output level of the signal light and the output level of the control signal light is set to exceed the threshold value. According to the embodiment, the optical reflector 4 selectively reflects only light having the wavelength "x" as the specific wavelength.

Now, as shown by FIG. 5(1), when the signal light having the wavelength "x" is added to the signal light having the wavelength "a" (refer to 1̂), both of the signal light and the control signal light are inputted to the optical reflector 4.

However, only the control signal light having the wavelength "x" is reflected by the optical reflector 4 and only the signal light having the wavelength "a" is inputted to the saturable absorber (refer to 2̂). When it is set such that only the signal light having the wavelength "a" cannot exceed the threshold value of the saturable absorber 5, as a result, nothing is outputted from the saturable absorber (refer to 3̂).

In contrast thereto, as shown by FIG. 5(2), when the control signal light having the wavelength "y" is added to the signal light, both light transmit the optical reflector 4 as they are and are inputted to the saturable absorber. When a sum of output levels of both light exceeds the threshold value, the signal light and the control signal light are outputted from the saturable absorber as they are. Accordingly, by changing the wavelength of the control signal light, the output of the signal light can be controlled.

Further, fiber gratings can be used for the above-described optical reflector. The fiber gratings are formed with gratings of a specific period at inside of an optical fiber and wavelength of reflected light is set by the period. In respect of the saturable absorber, there is known, for example, "Optical noise reduction by a semiconductor waveguide saturable absorber" Yoichi Hashimoto et al., CPT'98 (International Topical Workshop on Contemporary Photonic Technology) Technical Digest Pc-13-1. IEEE, Optical Society of America.

Next, an explanation will be given of an optical junction apparatus according to the present invention.

Figure 6:
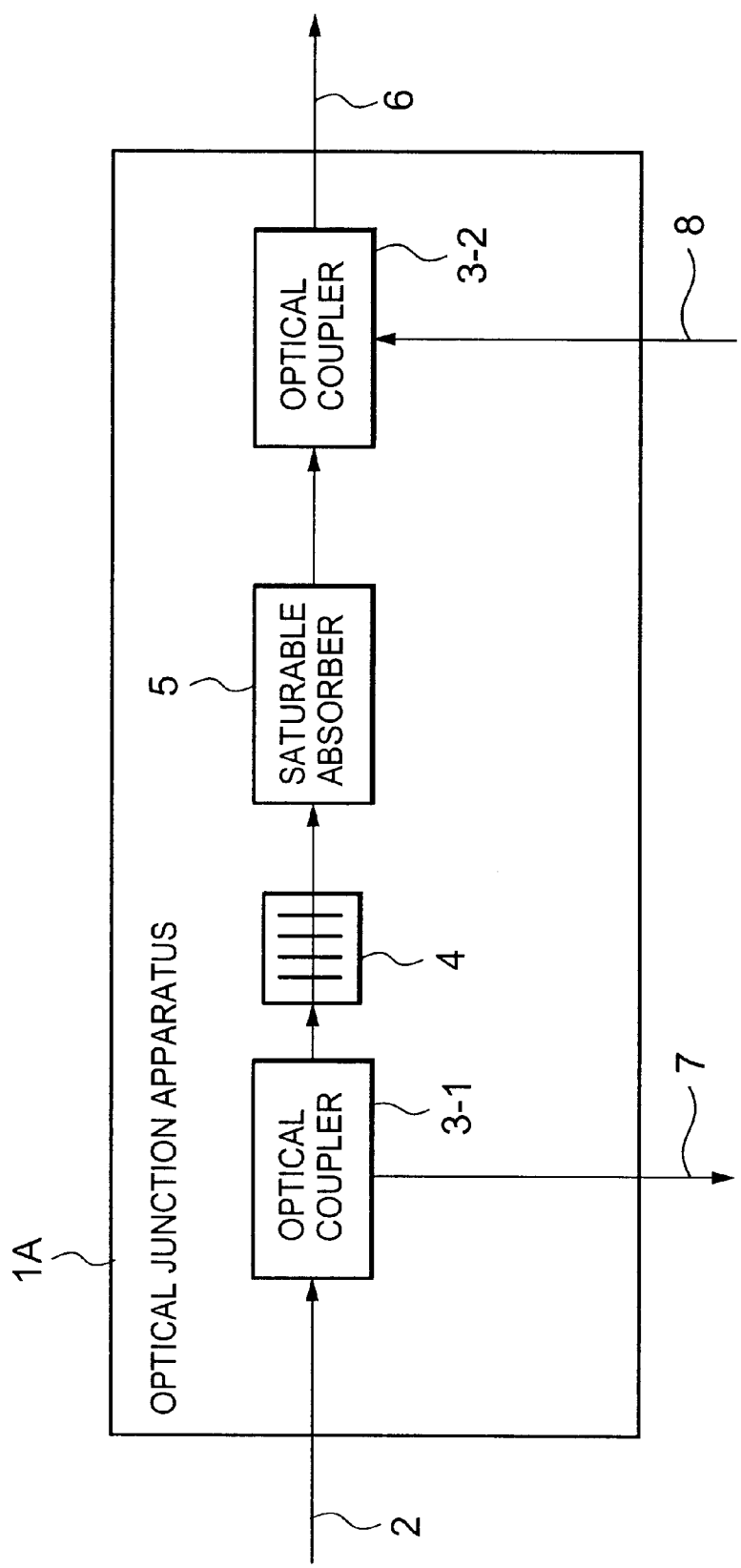
FIG. 6 is a diagram showing a constitution of a first embodiment of an optical junction apparatus according to the present invention.

FIG. 6 is a diagram showing a constitution of a first embodiment of an optical junction apparatus according to the present invention. The optical junction apparatus according to the present invention is constituted by the input port 2, the optical coupler 3-1, the fiber gratings 4, the saturable absorber 5, the optical coupler 3-2, the output port 6, the divided output port 7 and the divided input port 8.

An input of the optical coupler 3-1 is connected to the input port 2, one output thereof is connected to the divided output port 7 and other output thereof is connected to the fiber gratings 4. An output of the fiber gratings 4 is connected to an input of the saturable absorber 5 and an output thereof is connected to a first input of the optical coupler 3-2. A second input of the optical coupler 3-2 is connected to the divided input port 8 and an output thereof is connected to the output port 6. The saturable absorber 5 is provided with a function of outputting the inputted light only when light having a level equal to or more than a predetermined level is inputted.

An explanation will be given of operation of separating and inserting signal light in the optical junction apparatus according to the present invention.

Figure 7:
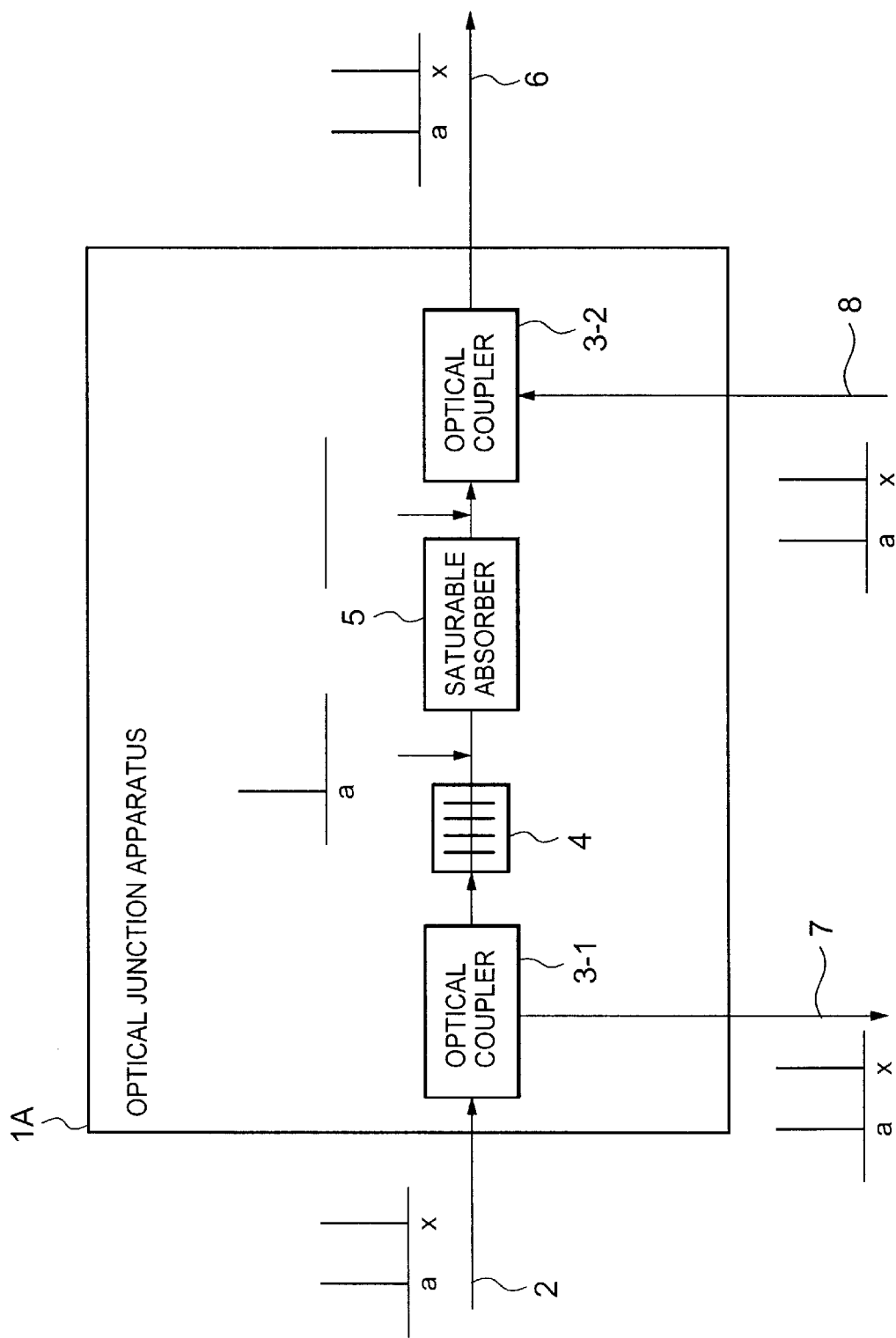
FIG. 7 is a diagram showing operation of the first embodiment of the optical junction apparatus according to the present invention shown by FIG. 6.

FIG. 7 is a diagram showing operation of the first embodiment of the present invention shown by FIG. 6, indicating separating and inserting operation. Signal light (wavelength "a") and control signal light (wavelength "x") are inputted from the input port 2. Inputted signals are outputted from the divided output port 7. The fiber gratings 4 reflect light having the wavelength "x". In this case, the saturable absorber 5 is set to transmit light only when the signal light and the control signal light are inputted.

Now, when light having the wavelength "x" is used as the control signal light, at this occasion, the control signal light in the signal light (wavelength "a") and the control signal light (wavelength "x") outputted from the second output of the optical coupler 3-1, is reflected by the fiber gratings 4 and only the signal light is inputted to the saturable absorber 5. The saturable absorber 5 transmits lights only when both of the signal light and the control signal light are inputted and accordingly, in a state in which only the signal light is inputted, nothing is outputted. Accordingly, the signal light is outputted only to the divided output port 7.

Figure 8:
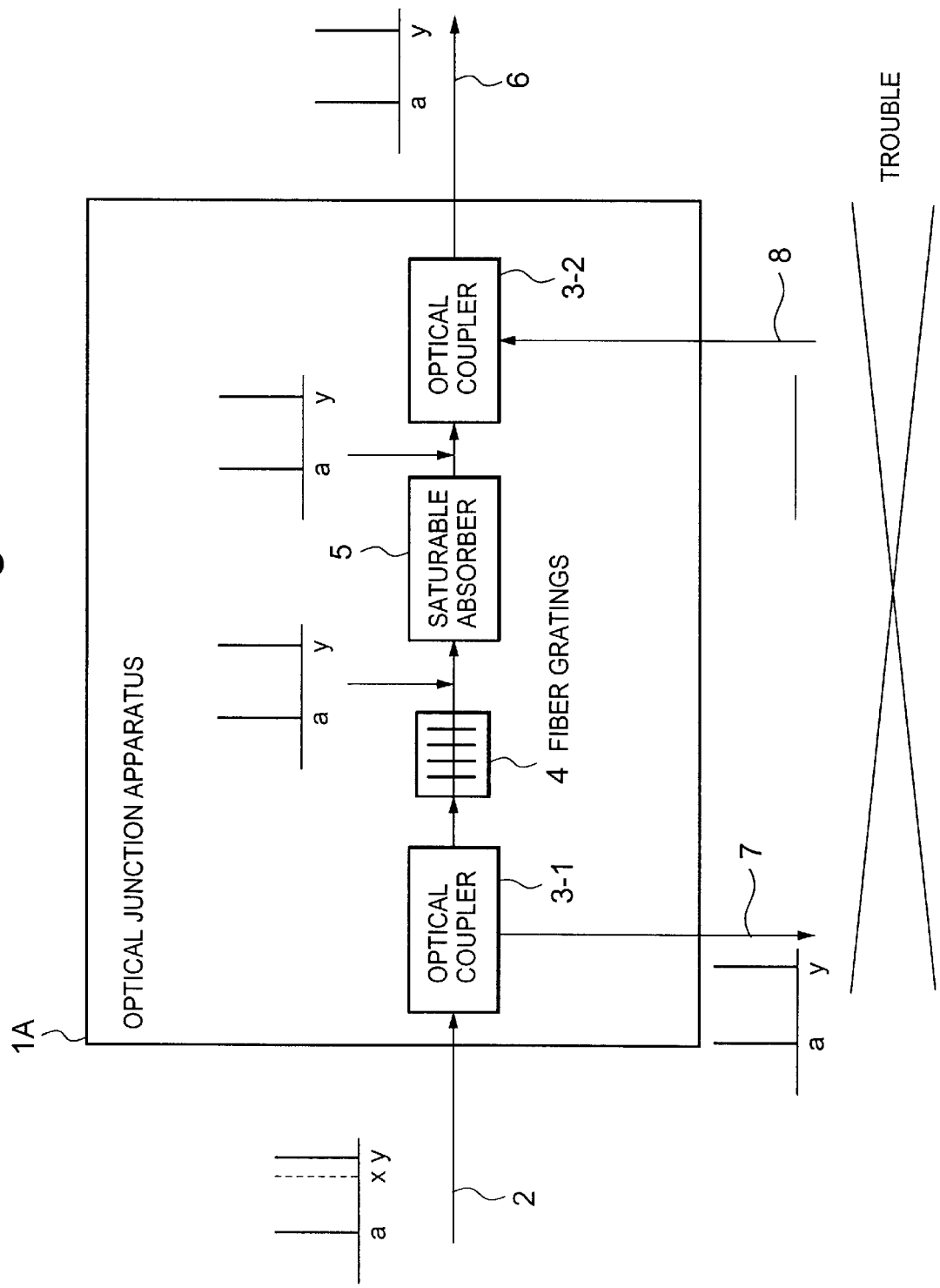
FIG. 8 is a diagram showing the operation of the first embodiment of the optical junction apparatus according to the present invention shown by FIG. 6.

Next, an explanation will be given of operation when trouble is caused on the divided side (in shortcircuiting) in reference to FIG. 8. FIG. 8 is a diagram showing the operation of the first embodiment according to the present invention shown by FIG. 6, indicating operation in shortcircuiting. First, the wavelength of the control signal light is changed from "x" to "y". In changing the wavelength of the control signal light, after detecting that trouble is caused on the divided side, a wavelength of a light source of the control signal light at the end office A may be changed or the wavelength may be changed after temporarily dividing the control signal light from the signal light inputted at inside of the optical junction apparatus. At this moment, the control signal light transmits through the fiber gratings 4 and is inputted to the saturable absorber 5 along with the signal light. Then, the signal light and the control signal light are outputted from an output thereof and are outputted from the output port 6 via the optical coupler 3-2. Thereby, the signal light is shortcircuited when trouble is caused on the divided side. Further, the control light may not be multiplexed with the original signal light in a steady state and may be synthesized therewith only when trouble is caused.

Figure 9:
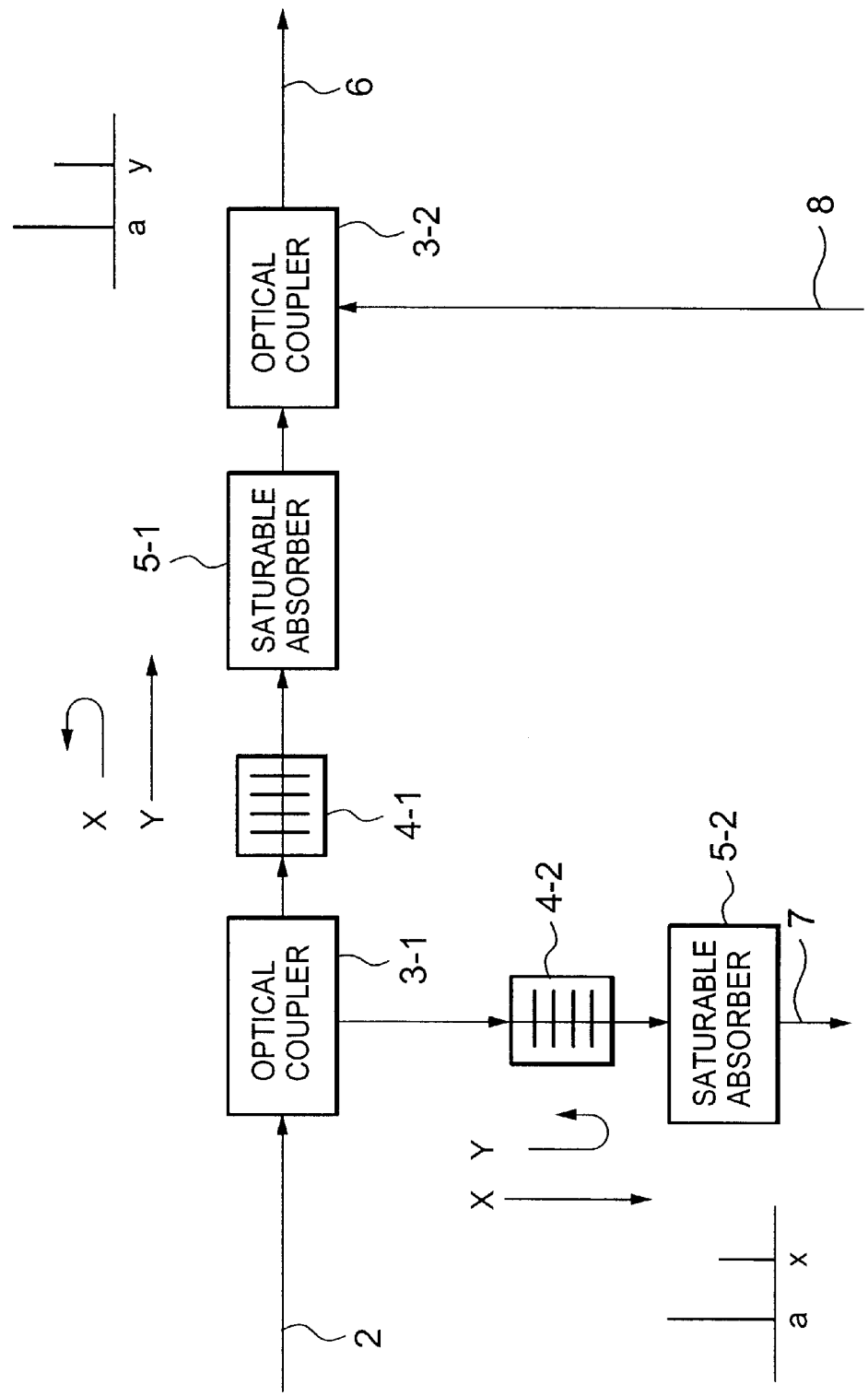
FIG. 9 is a diagram showing a constitution of a second embodiment of an optical junction apparatus according to the present invention.

FIG. 9 is a diagram also showing an embodiment of an optical junction apparatus according to the present invention and its basic constitution is similar to that of the first embodiment shown by FIG. 6. According to the embodiment, the optical control apparatus according to the present invention is arranged also in respect of the signal light separated by the optical coupler 3-1. In this case, there is used an optical reflector 4-2 constituting the optical control apparatus, which reflects the control signal light when the wavelength of the control signal light is "y". Therefore, when the wavelength of the control signal light is "y" and the signal light is shortcircuited, the signal light can be prevented from being outputted from the output port. When the wavelength of the control signal light is set to "x", the signal light is outputted from the output port 7.

Next, an explanation will be given of a constitution of an optical ADM apparatus according to the present invention in reference to FIG. 10.

Figure 10:
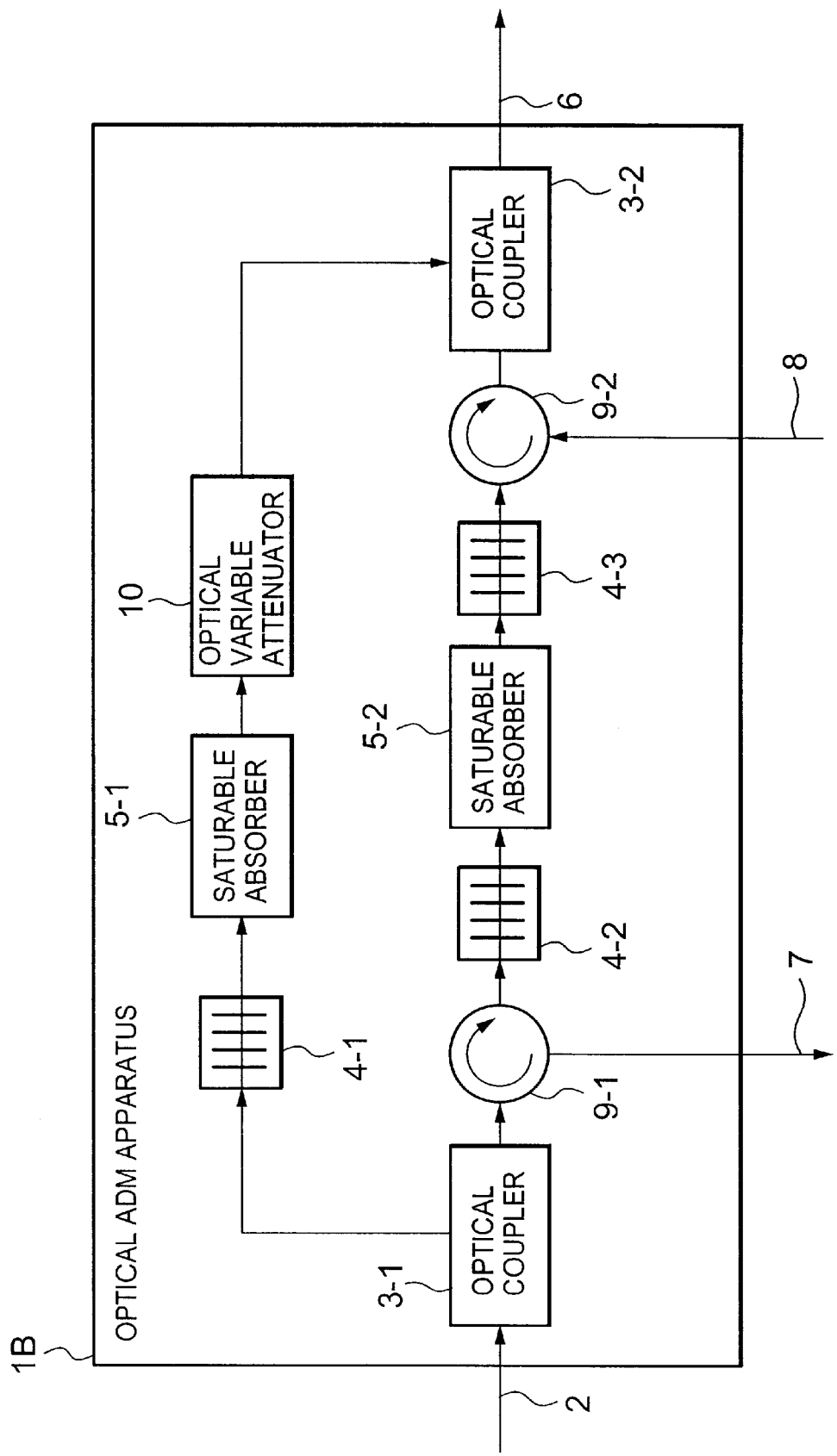
FIG. 10 is a diagram showing a constitution of a first embodiment of an optical ADM apparatus according to the present invention.

As shown by FIG. 10, the optical ADM apparatus according to the present invention is constituted by the input port 2, the optical coupler 3-1, the optical coupler 3-2, the fiber gratings 4-1, the fiber gratings 4-2, the fiber gratings 4-3, the saturable absorber 5-1, the saturable absorber 5-2, the output port 6, the divided output port 7, the divided input port 8, the optical circulator 9-1, the optical circulator 9-2 and an optical variable attenuator 10.

According to the optical ADM apparatus of the present invention, basically, similar to the optical dividing device which has already been explained in reference to FIG. 6, the optical path switching is controlled by using the fiber gratings and the saturable absorbers.

An input of the optical coupler 3-1 is connected to the input port 2, a first output is connected to an input of the fiber gratings 4-1 and a second output is connected to an input of the optical circulator 9-1. An output of the fiber gratings 4-1 is connected to an input of the saturable absorber 5-1 and an output thereof is connected to an input of the optical variable attenuator 10. A first output of the optical circulator 9-1 is connected to the divided output port 7 and a second output thereof is connected to an input of the fiber gratings 4-2. An output of the fiber gratings 4-2 is connected to an input of the saturable absorber 5-2 and an output thereof is connected to an input of the fiber gratings 4-3. An output thereof is connected to a first input of the optical circulator 9-2. A second input of the optical circulator 9-2 is connected to the divided input port 8 and an output thereof is connected to a first input of the optical coupler 3-2. An output of the optical variable attenuator 10 is connected to a second input of the optical coupler 3-2 and an output of the optical coupler 3-2 is connected to the output port 6.

The fiber gratings 4-1 reflect only light having a wavelength "x" and transmit light having other wavelength. Both of the saturable absorbers 5-1 and 5-2 are provided with a function in which when light having a level equal to or more than a predetermined level (threshold level) is inputted, the inputted light is transmitted as it is and when light having the threshold value or less is inputted, the inputted light is not outputted. The saturable absorber 5-1 is set to transmit light only when the signal light and the control signal light are inputted.

The fiber gratings 4-2 reflect only light having a wavelength "y" and transmit light having other wavelength. The fiber gratings 4-3 reflect only light having a wavelength "b" and transmit light having other wavelength.

Figure 11:
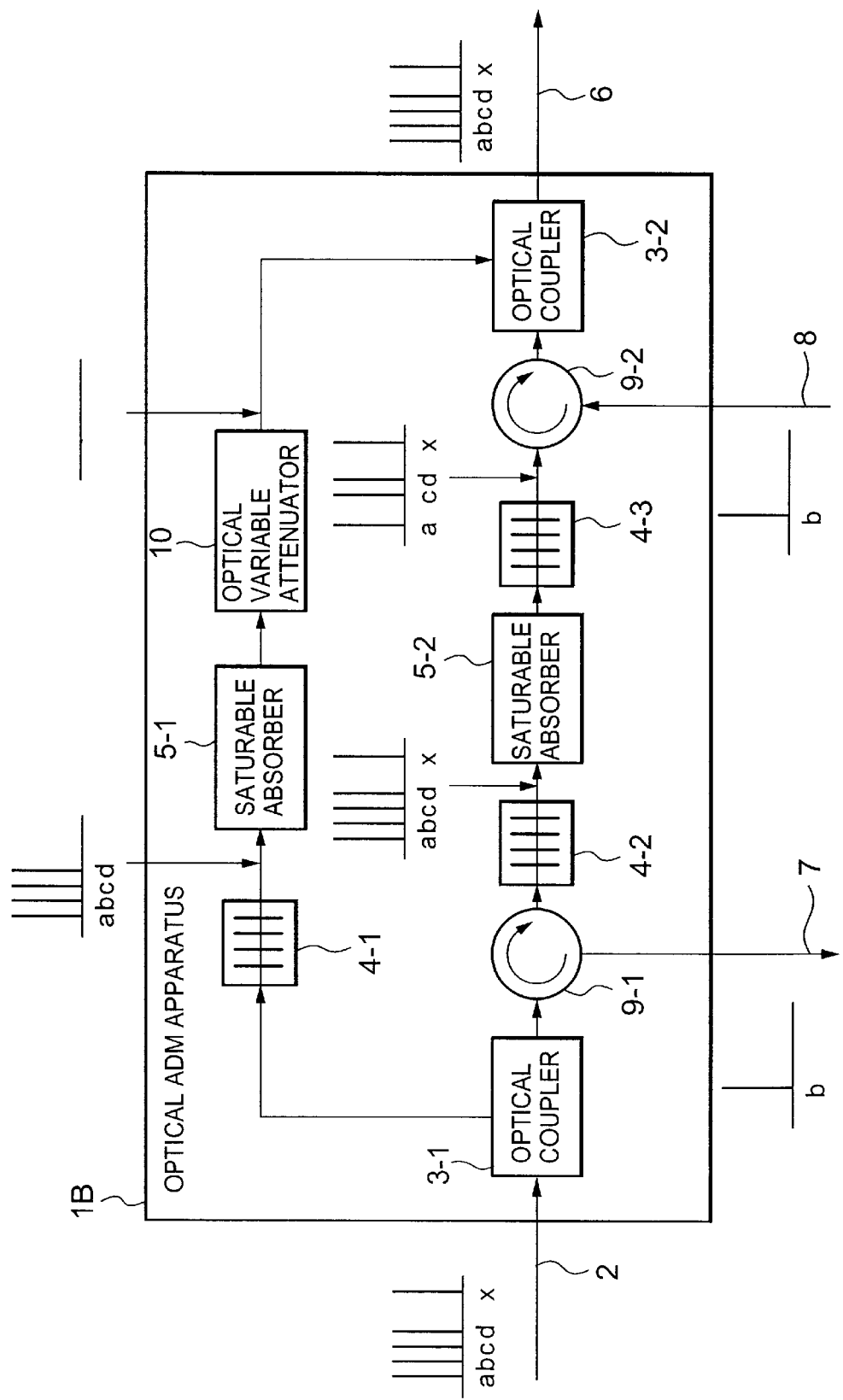
FIG. 11 is a diagram showing operation of the first embodiment of the optical ADM apparatus according to the present invention shown by FIG. 10.
Figure 12:
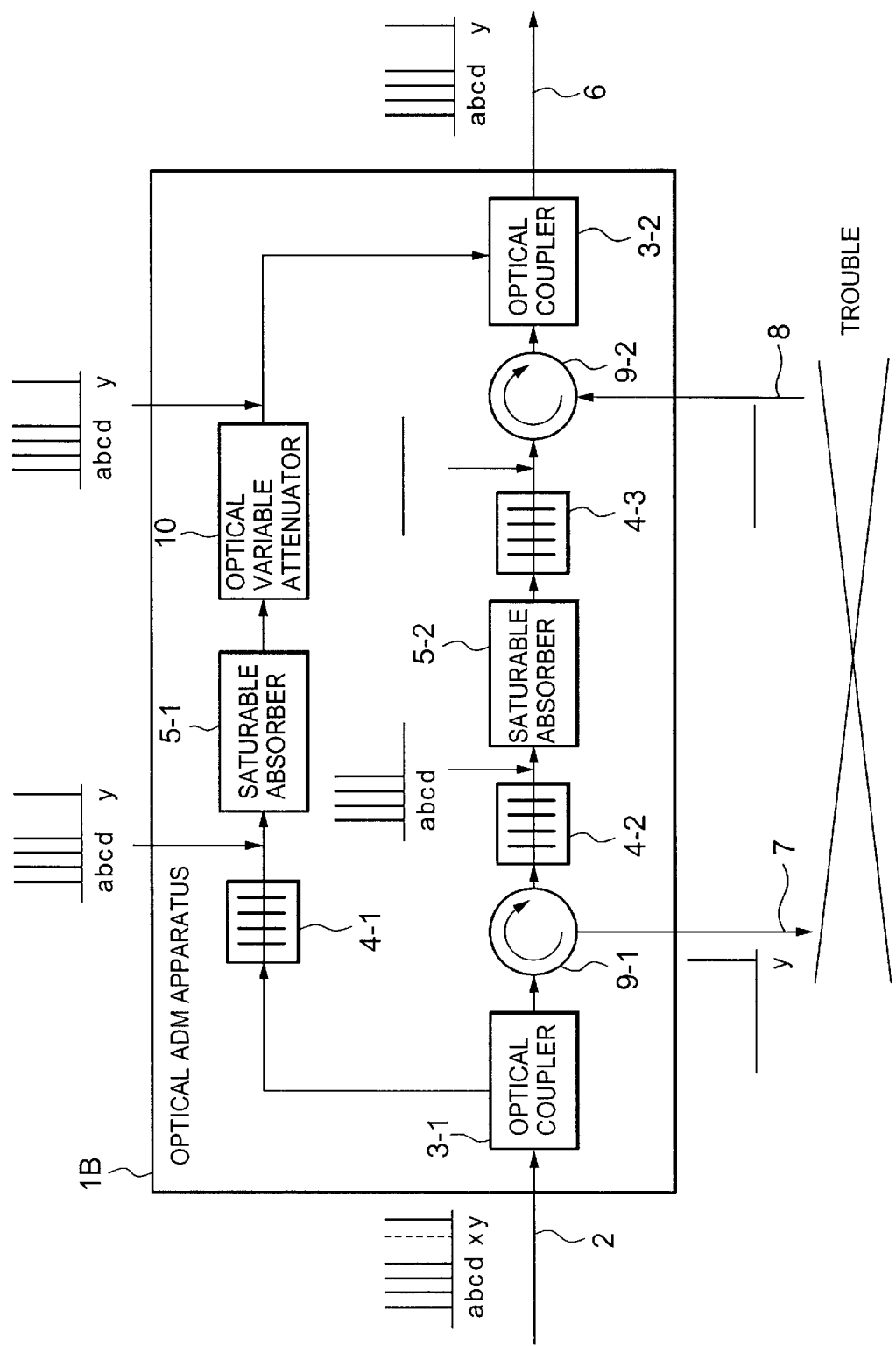
FIG. 12 is a diagram showing the operation of the first embodiment of the optical ADM apparatus according to the present invention shown by FIG. 10.

An explanation will be given of operation of the optical ADM apparatus shown by FIG. 10. FIGS. 11 and 12 are diagrams respectively showing operation of the optical ADM apparatus according to the present invention shown by FIG. 10.

First, an explanation will be given of operation in steady state operation in reference to FIG. 11. In steady state operation, in wavelength division multiplexing signal light, only signal light having a wavelength "b" is separated and outputted from the output port 7. Meanwhile, signal light having the wavelength "b" is multiplexed and inserted to the wavelength division multiplexing signal light as signal light from the optical ADM apparatus from the input port 8.

In the steady state operation, wavelength division multiplexing signal light in which signal light having wavelengths a through d is subjected to wavelength division multiplexing and control signal light (wavelength "x") are inputted from the input port 2. The wavelength of the control signal light at this occasion is "x". In the wavelength division multiplexing signal light and the control signal light divided by the optical coupler 3-1, the control signal light is reflected by the fiber gratings 4-1. The wavelength division multiplexing signal light transmits through the fiber gratings 4-1 and the saturable absorber 5-1 is inputted only with the wavelength division multiplexing signal light. At this occasion, the saturable absorber 5-1 is set to transmit light only when the signal and the control signal light are inputted and accordingly, nothing is outputted from the output.

The fiber gratings 4-2 reflect only light having the wavelength "y" and accordingly, the wavelength division multiplexing signal light and the control signal light which are inputted from the other output of the optical coupler 3-1 to the optical circulator 9-1, transmit through the fiber gratings 4-2. Although both of the signal light are further inputted to the saturable absorber 5-2, since the level exceeds a predetermined threshold value, the wavelength division multiplexing signal light and the control signal light are outputted as they are.

In the wavelength division multiplexing signal light and the control signal outputted from the saturable absorber 5-2, at the fiber gratings 4-3, only signal light having a wavelength "b" in the wavelength division multiplexing signal light is reflected. The reflected signal light again transmits through the saturable absorber 5-2 in a reverse direction (from right to left of the drawing). At this occasion, although the level per se of the signal light having the wavelength "b" is lower than the threshold value, the wavelength division multiplexing signal light and the control signal light are inputted and therefore, the signal light can transmit through the saturable absorber 5-2. The signal light having the wavelength "b" progressing in the reverse direction transmits through the fiber gratings 4-2 and is outputted from the side of the output port 7 of the optical circulator 9-1.

Paying attention to the optical circulator 9-2, the signal light having the wavelength "b" inputted from the input port 8 is outputted from a left output port in the drawing of the optical circulator 9-2. The signal light having the wavelength "b" is reflected by the fiber gratings 4-3 and is again inputted to the optical circulator 9-2 from the same port. The signal light having the wavelength "b" inputted to the optical circulator 9-2 is multiplexed to the wavelength division multiplexing signal light (wavelengths a, c, d) except the signal light having the wavelength "b" and the control signal light (wavelength x) which have transmitted through the fiber gratings 4-3 and outputted from a right port of the optical circulator 9-2. The wavelength division multiplexing signal light which include signal light of all the wavelengths and the control signal light, transmit through the optical coupler 3-2 and is outputted from the output port 6.

Next, an explanation will be given of operation in reference to FIG. 12 when the wavelength division multiplexing signal light is made to transmit through the optical ADM apparatus as it is and is outputted from the output port 6.

First, the wavelength of the control signal light is changed from "x" to "y". At this occasion, the control signal light transmits through the fiber gratings 4-1 and is inputted to the saturable absorber 5-1 along with the signal light (wavelengths a, b, c, d). Then, the signal light and the control signal light exceeds the predetermined threshold value and accordingly, outputted from the saturable absorber 5-1 as they are and pass through the optical variable attenuator 10. The signal light and the control signal light outputted from the optical variable attenuator 10 are outputted from the output port 6 via the optical coupler 3-2.

In the meantime, at the fiber gratings 4-2, the control signal light (wavelength "y") is reflected and accordingly, only the signal light is inputted to the saturable absorber 5-2. Accordingly, nothing is outputted from the saturable absorber 5-2. As a result, the signal light and the control signal light inputted from the port 2 are shortcircuited as they are and outputted from the output port 6.

In this way, by using the saturable absorber and controlling the wavelength of the control signal light, switching of optical path can be carried out when trouble is caused. This achieves an effect in a transmission system having an optical repeater an output of which is controlled constant. There also is achieved an advantage in which the level of the shortcircuited signal light is always the same as the level of other signal light.

As has been explained, according to the present invention, by using the saturable absorber, the switching operation is carried out by controlling light and accordingly, the response speed can also be promoted. The reliability is promoted since a path switching unit is not of a mechanical structure. Further, the switching operation can be controlled by control signal light from outside transmitted from an end office or the like disposed on the upstream side of an optical transmission path.

Figure 13:
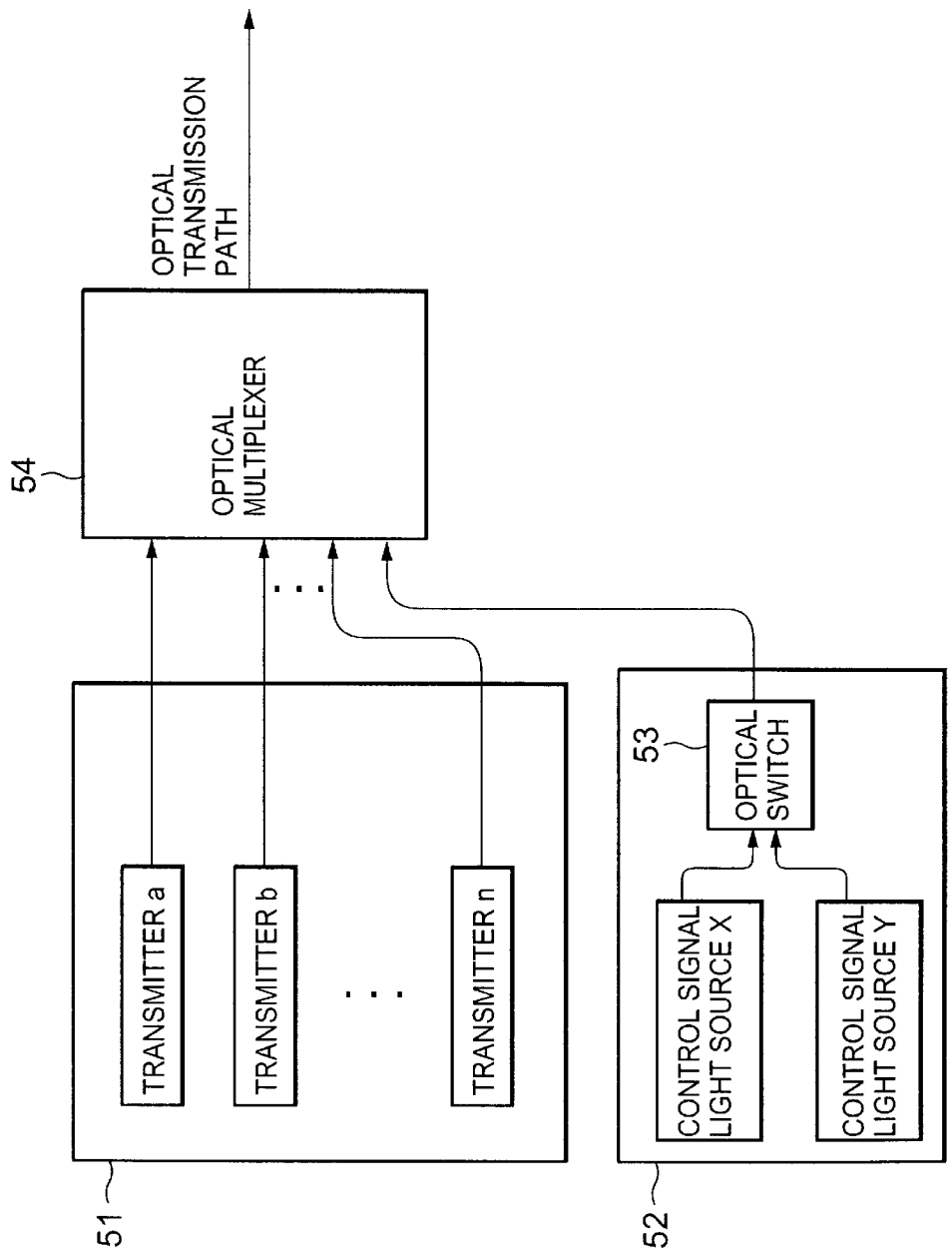
FIG. 13 is a diagram showing a first embodiment of an optical transmitting apparatus used in an optical transmission apparatus having the optical ADM apparatus according to the present invention.

Next, an explanation will be given of an optical transmission apparatus for transmitting WDM signal light multiplexed to control signal light, which are inputted to the optical ADM apparatus according to the present invention. FIG. 13 is a diagram showing a first embodiment of an optical transmitting apparatus used in an optical transmission apparatus having the optical ADM apparatus according to the present invention.

In the optical transmission apparatus (end office), there are arranged optical transmitters a through n for transmitting signal light having respective wavelengths included in WDM signal light. Meanwhile, there are arranged light sources "x" and "y" for transmitting respective control signal light having wavelengths "x" and "y". An optical switch is arranged at a prestage of the control signal light sources "x" and "y" and which wavelength of the control signal light is to be multiplexed to the WDM signal light can be selected. Signal light a through n transmitted from the respective optical transmitters is subjected to wavelength division multiplexing by an optical multiplexer 54 along with the selected control signal and transmitted to an optical transmission path. Further, in order to be able to multiplex the control signal light to the WDM signal light regardless of whether the wavelength is "x" or "y", there may be used a short wave path filter (SWPF) (or long wave path filter (LWPF)) for reflecting all of wavelengths of the WDM signal light and transmitting either of the control signal light (or vice versa). For example, when signal light having wavelengths of 1551, 1553, 1555 and 1557 nm is used for the WDM signal light and light having wavelengths of 1310 nm and 1320 nm is used for the control signal light, there can be constructed a constitution by an optical filter for reflecting light of a 1550 nm band and transmitting light of a 1310 nm band.

Figure 14:
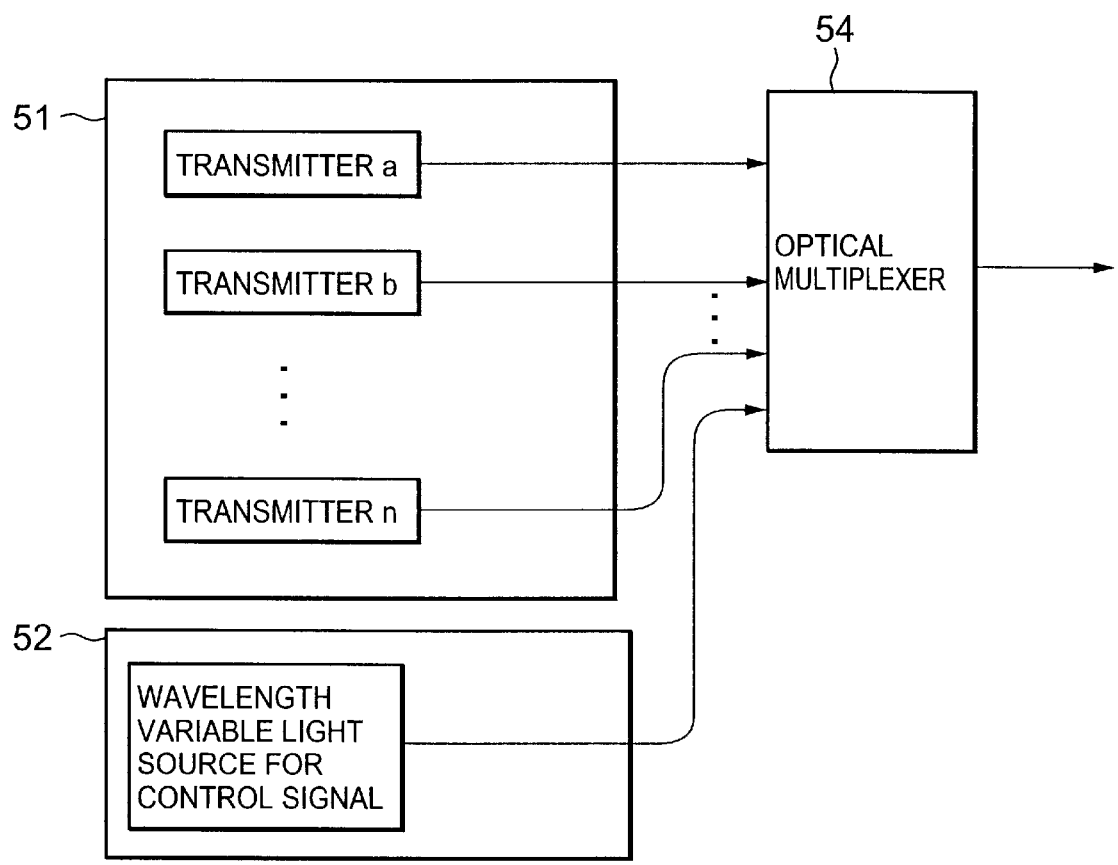
FIG. 14 is a diagram showing a second embodiment of an optical transmitting apparatus used in the optical transmission apparatus having the optical ADM apparatus according to the present invention.

FIG. 14 is a diagram showing a second embodiment of an optical transmitting apparatus used in an optical transmission apparatus having the optical ADM apparatus according to the present invention. The constitution of FIG. 14 differs from the constitution shown by FIG. 13 in that a wavelength variable light source is used for a control signal light source 52.

Figure 15:
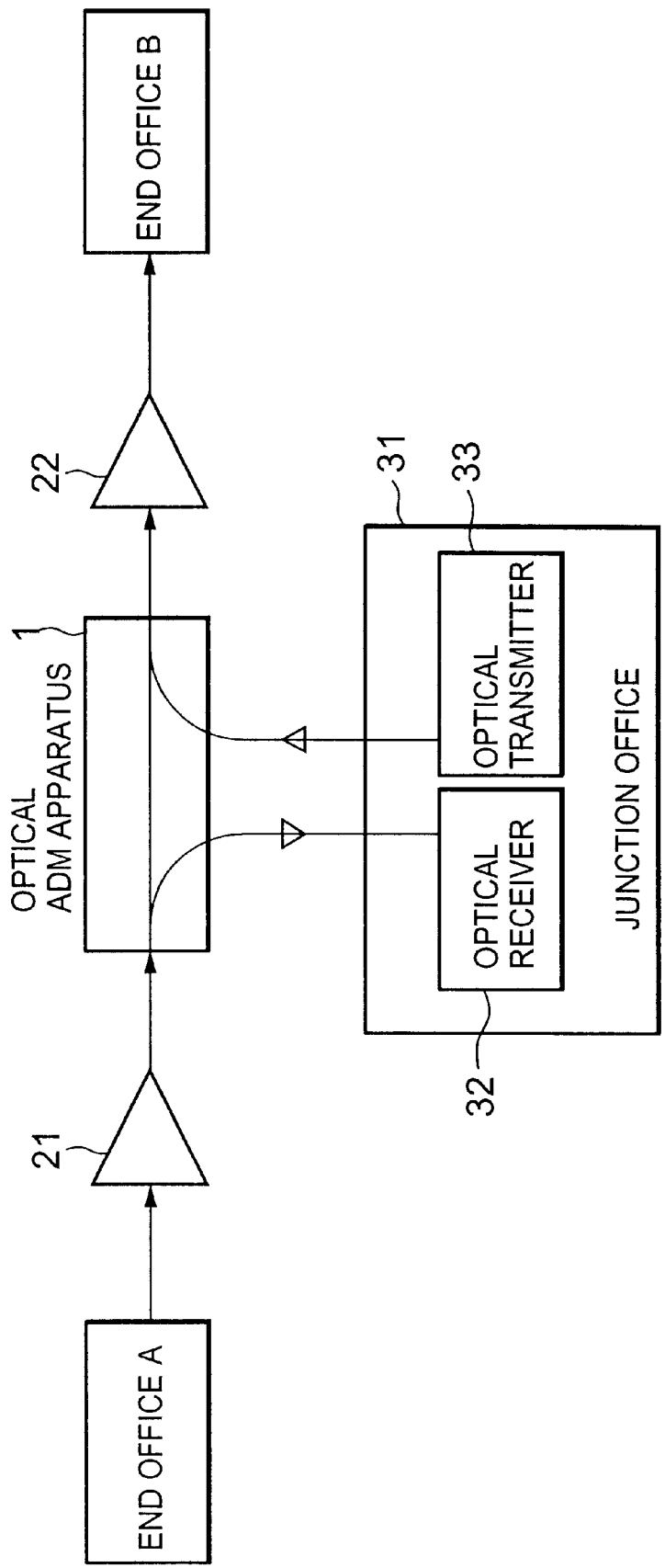
FIG. 15 is a diagram showing a constitution of a first embodiment of the optical transmission apparatus having the optical ADM apparatus according to the present invention.

FIG. 15 is a diagram showing a first embodiment of an optical transmission apparatus of an optical transmission apparatus having the optical ADM apparatus according to the present invention. The optical ADM apparatus according to the present invention is arranged between an end office A and an end office B and optical amplifiers 21 and 22 for optically amplifying WDM signal light are further arranged therebetween. By selecting wavelength of control signal light which is transmitted from the end office A (optical transmitting apparatus) and multiplexed to the signal light, operation of separating and inserting the signal light at the optical ADM apparatus can be controlled.

Figure 16:
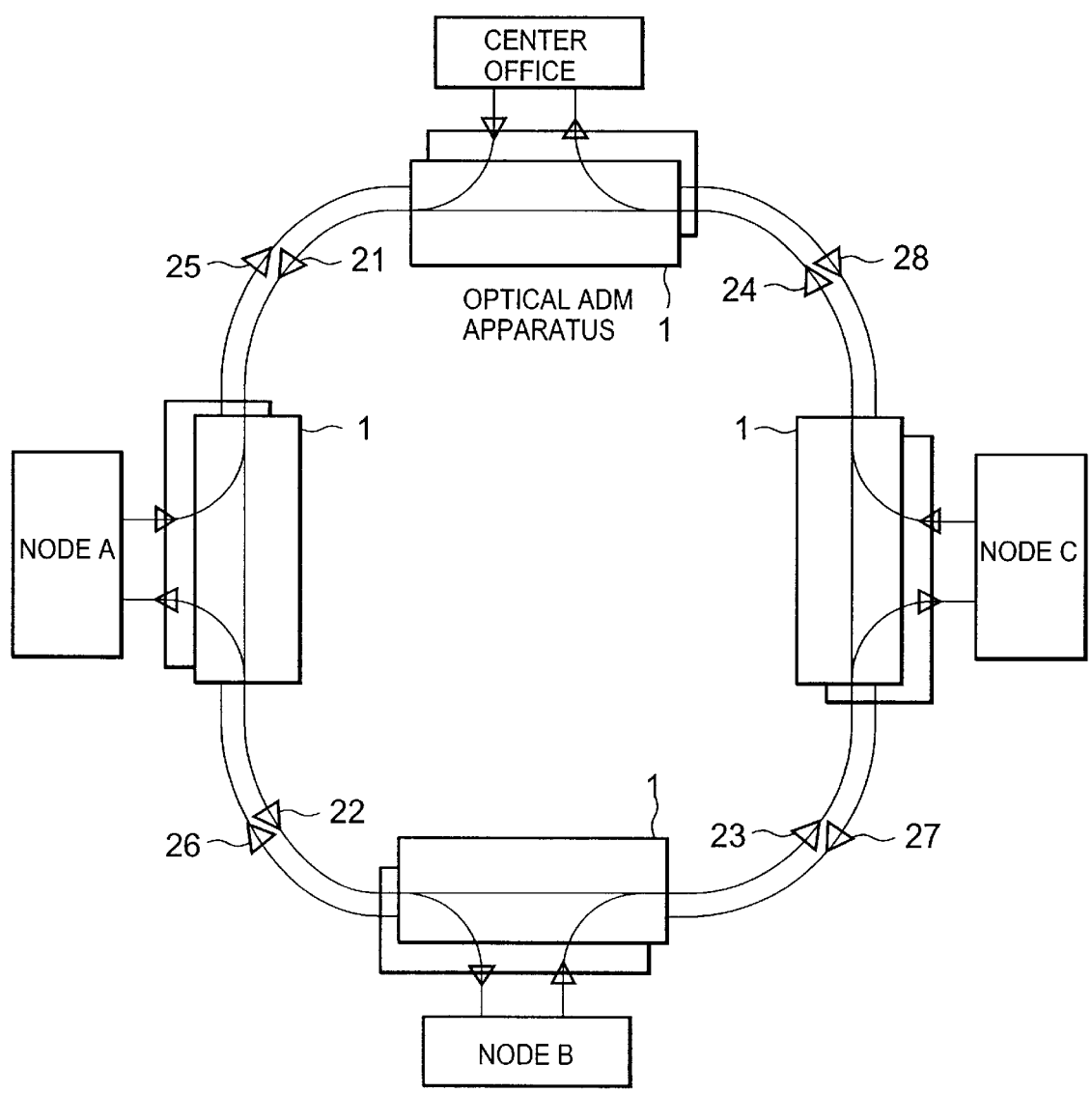
FIG. 16 is a diagram showing a constitution of a second embodiment of an optical transmission apparatus having the optical ADM apparatus according to the present invention.

FIG. 16 is a diagram showing a constitution of a second embodiment of an optical transmission apparatus having the optical ADM apparatus according to the present invention. A plurality of the optical ADM apparatus according to the present invention are arranged and a network is constituted in a ring-like shape. A center office and a plurality of nodes A through C are arranged and connected by an optical transmission path. According to the embodiment, they are connected by two of optical transmission paths such that the signal light can be transmitted in both directions. Optical amplifiers 21 through 28 are arranged between the nodes or between the nodes and the center office. By arranging the optical ADM apparatus according to the present invention at the respective nodes or the center office, for example, by changing wavelength of control signal light added to signal light transmitted from the center office, whether signal light is to be separated or inserted by an object node can be controlled.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optical junction apparatus comprising:
   a first optical coupler for dividing inputted signal light and outputting first divided signal light and second divided signal light;
   a first optical reflector inputted with the first divided signal light for selectively reflecting only light having a first specific wavelength, transmitting light having other wavelength and outputting transmitted signal light;
   a first saturable absorber inputted with the transmitted signal light for transmitting the transmitted signal light only when an output level of the transmitted signal light is equal to or larger than a predetermined first threshold value and outputting first output signal light; and
   a second optical coupler for outputting to outside the inputted first optical signal light or second output signal light in the first output signal light and the second output signal light.

2. The optical junction apparatus according to claim 1:
   wherein the first optical coupler is further inputted with control signal light in addition to the signal light;
   wherein when a wavelength of the control signal light coincides with the first specific wavelength, an output level of the signal light inputted to the first saturable absorber is set to be lower than the first threshold value; and
   wherein when the wavelength of the control signal light does not coincide with the first specific light, a sum of the output level of the signal light and an output level of the control signal light which are inputted to the first saturable absorber, is set to exceed the first threshold value.

3. The optical junction apparatus according to claim 2:
   wherein the first optical reflector is constituted by fiber gratings.

4. The optical junction apparatus according to claim 3, further comprising:
   a second optical reflector inputted with the second divided signal light for selectively reflecting only light having a second specific wavelength, transmitting light having other wavelength and outputting transmitted signal light; and
   a second saturable absorber inputted with the transmitted signal light for transmitting the transmitted signal light only when an output level of the transmitted signal light is equal to or larger than a second predetermined threshold value and outputting second output signal light.

5. The optical junction apparatus according to claim 4:
   wherein when the wavelength of the control signal light coincides with the second specific wavelength, the output level of the signal light inputted to the second saturable absorber is lower than the second threshold value; and wherein when the wavelength of the control signal light does not coincide with the specific wavelength, a sum of the output level of the signal light inputted to the second saturable absorber and the output level of the control signal light exceeds the second threshold value.

6. The optical junction apparatus according to claim 5:
   wherein the second optical reflector is constituted by fiber gratings.

7. An optical ADM apparatus inputted with WDM signal light in which a plurality of signal light having wavelengths different from each other are subjected to wavelength division multiplexing and control signal light for separating only separated signal light having a predetermined wavelength included in the WDM signal light and inserting inserted signal light having the predetermined wavelength, said optical ADM apparatus comprising:
   a first optical control apparatus comprising:
      an optical reflector for selectively reflecting only signal light having a specific wavelength in inputted signal light and transmitting signal light having other wavelength and outputting transmitted signal light; and
      a saturable absorber inputted with the transmitted signal light for transmitting the transmitted signal light and outputting first output signal light only when an output level of the transmitted signal light is equal to or larger than a predetermined threshold value,
      said first optical control apparatus being configured for outputting the WDM signal light other than the separated signal light in the WDM signal light when light having a second specific wavelength is inputted along with the WDM signal light;
   a signal light separating and inserting unit for outputting multiplexed signal light by multiplexing the inserted signal light with the WDM signal light outputted from the optical control apparatus; and
   a second optical control apparatus comprising:
      a second optical reflector for selectively reflecting only signal light having a specific wavelength in inputted signal light and transmitting signal light having other wavelength and outputting transmitted signal light; and
      a second saturable absorber inputted with the transmitted signal light for transmitting the transmitted signal light and outputting first output signal light only when an output level of the transmitted signal light is equal to or larger than a predetermined threshold value,
      said second optical control apparatus being configured for outputting the WDM signal light as it is when light having the first specific wavelength is inputted along with the WDM signal light.

8. The optical ADM apparatus according to claim 7:
   wherein the signal light separating and inserting unit comprises:
      a first optical circulator arranged on an input side of the first optical control apparatus;
      a second optical circulator arranged on an output side of the first optical control apparatus; and
      a signal light reflector arranged between the first control apparatus and the second optical circulator for selectively reflecting light having a wavelength of the separated signal light.

9. An optical ADM apparatus comprising:
   a first optical coupler inputted with WDM signal light in which a plurality of signal light having wavelengths different from each other are subjected to wavelength division multiplexing for dividing the WDM signal light and outputting first divided WDM signal light and second divided WDM signal light;

a first optical circulator inputted with the first divided WDM signal light from a first port thereof for outputting the first divided WDM signal light to a second port and outputting the first divided WDM signal light inputted from the second port to a third port thereof;

a first optical reflector inputted with the first divided WDM signal light for selectively reflecting only light having a first specific wavelength, transmitting light having other wavelength and outputting first transmitted WDM signal light;

a first saturable absorber inputted with the first transmitted WDM signal light for transmitting the first transmitted WDM signal light only when an output level of the first transmitted WDM signal light is equal to or larger than a first threshold value and outputting first output WDM signal light;

a signal light reflector for selectively reflecting only separated signal light having a predetermined wavelength from the first output WDM signal light, transmitting signal light having other wavelength and outputting transmitted output WDM signal light;

a nultiplexing unit for synthesizing the transmitted output WDM signal light with inserted signal light having a wavelength the same as a wavelength of the separated signal light and outputting synthesized signal light;

a second optical reflector inputted with the second divided WDM signal light for selectively reflecting only light having a second specific wavelength, transmitting light having other wavelength and outputting second transmitted WDM signal light;

a second saturable absorber inputted with the second transmitted WDM signal light for transmitting the second transmitted WDM signal light only when an output level of the second transmitted WDM signal light is equal to or larger than a second threshold value and outputting second output WDM signal light; and a second optical coupler for outputting to outside inputted multiplexed signal light or the output WDM signal light.

10. The optical ADM apparatus according to claim 9:
wherein the multiplexing unit is the second optical circulator in which the transmitted output WDM signal light is inputted from a fourth port thereof, the transmitted output WDM signal light is outputted from a fifth output port thereof, inserted signal light inputted from a sixth port thereof is outputted to the fifth port and the multiplexed signal light multiplexed to the transmitted output WDM signal light and the inserted signal light is outputted.

11. The optical ADM apparatus according to claim 9:
wherein the multiplexing unit is a wavelength division multiplexer for multiplexing light having a wavelength of the signal light included in the transmitted output WDM signal light and light having a wavelength of the inserted signal light.

12. The optical ADM apparatus according to claim 9:
wherein the first optical coupler is further inputted with control signal light in addition to the signal light;
wherein when a wavelength of the control signal light coincides with the first specific wavelength, an output level of the signal light inputted to the first saturable absorber is set to be lower than the first threshold value; and wherein when the wavelength of the control signal light does not coincide with the first specific wavelength, a sum of the output level of the signal light inputted to the first saturable absorber and an output level of the control signal light is set to exceed the first threshold value.

13. The optical ADM apparatus according to claim 12:
wherein the first optical reflector and the second optical reflector are constituted by fiber gratings.

14. The optical ADM apparatus according to claim 12, further comprising:
an optical variable attenuator arranged on an output side of the second saturable absorber for controlling an output level of the second transmitted WDM signal light.

15. An optical transmission apparatus comprising:
an optical ADM apparatus according to claim 9; and
an optical end office apparatus for transmitting WDM signal light in which a plurality of signal light having wavelengths different from each other are subjected to wavelength division multiplexing and control signal light synthesized with the WDM signal light.

16. The optical transmission apparatus according to claim 15:
wherein the optical end office apparatus comprises:
transmitters respectively transmitting respective signal light included in the WDM signal light;
control signal light sources for transmitting light having the first specific wavelength and light having the second specific wavelength; and
a wavelength division multiplexer for multiplexing the WDM signal light with the control signal light.

17. The optical transmission apparatus according to claim 16:
wherein the control signal light sources comprise:
a first control signal light source for transmitting light having the first specific wavelength;
a second control signal light source for transmitting light having the second specific wavelength; and
an optical switch for selectively switching to output the light having the first specific wavelength and the light having the second specific wavelength.

18. The optical transmission apparatus according to claim 16:
wherein the control signal light source comprises:
a light source; and
a wavelength controller for variably controlling light outputted from the light source to the first specific wavelength or the second specific wavelength.

19. The optical transmission apparatus according to claim 16:
wherein the optical ADM apparatus further comprising:
an optical receiver for receiving the separated signal light; and
an optical transmitter for transmitting the inserted signal light.

20. The optical transmission apparatus according to claim 16, further comprising:
an optical amplifier arranged between the optical end office apparatus and the optical ADM apparatus for optically amplifying the WDM signal light and the control signal light.

21. An optical transmission apparatus having a plurality of the optical ADM apparatus according to claim 9 and in which the plurality of optical ADM apparatus are connected in a ring-like shape via an optical transmission path:

wherein the respective optical ADM apparatus comprises:
an optical receiver for receiving the separated signal light; and
an optical transmitter for transmitting the inserted signal light.

22. An optical junction apparatus comprising:

an input port and an output port;

a divided output port and a divided input port;

fiber gratings;

a saturable absorber connected to an output of the fiber gratings;

a first coupler an input of which is connected to the input port, one output of which is connected to the divided output port and other output of which is connected to an input of the fiber gratings, respectively; and a second optical coupler one input of which is connected to the saturable absorber, other input of which is connected to the divided input port and an output of which is connected to the output port, respectively;

wherein the fiber gratings are set to reflect control signal light having a predetermined wavelength and the saturable absorber is set to transmit light only when the signal light and the control signal light are inputted.

23. An optical ADM apparatus comprising:

an input port and an output port;

a divided output port and a divided input port;

a first saturable absorber;

a second saturable absorber;

an optical variable attenuator an input of which is connected to an output of the first saturable absorber; and first fiber gratings an output of which is connected to an input of the first saturable absorber;

second fiber gratings an output of which is connected to an input of the second saturable absorber;

third fiber gratings an input of which is connected to an output of the second saturable absorber;

a first optical circulator an output of which is connected to the divided output port and other output of which is connected to an input of the second fiber gratings;

a second optical circulator one input of which is connected to the divided input port and other input of which is connected to an output of the third fiber gratings;

a first optical coupler an input of which is connected to the input port, one output of which is connected to an input of the first fiber gratings and other output of which is connected to an input of the first optical circulator, respectively; and a second optical coupler one input of which is connected to an output of the optical variable attenuator and other input is connected to an output of the second circulator and an output of which is connected to the output port;

wherein the first and the second fiber gratings respectively are set to reflect control signals of predetermined first and second wavelengths and the first and second saturable absorbers are set to transmit light only when signal light and control signal light are inputted.

* * * * *